US012616226B2

(12) United States Patent
She et al.

(10) Patent No.: US 12,616,226 B2
(45) Date of Patent: May 5, 2026

(54) COMPOSITIONS AND METHODS FOR PET FOOD

(71) Applicant: Société des Produits Nestlé S.A., Vevey (CH)

(72) Inventors: Manjuan Jenny She, Chesterfield, MO (US); Isaac Ashie, Ballwin, MO (US)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 376 days.

(21) Appl. No.: 17/526,607

(22) Filed: Nov. 15, 2021

(65) Prior Publication Data

US 2022/0183320 A1 Jun. 16, 2022

Related U.S. Application Data

(60) Provisional application No. 63/124,221, filed on Dec. 11, 2020.

(51) Int. Cl.
*A23K 10/30* (2016.01)
*A23K 50/42* (2016.01)

(52) U.S. Cl.
CPC .............. *A23K 10/30* (2016.05); *A23K 50/42* (2016.05)

(58) Field of Classification Search
CPC ...... A23K 10/30; A23K 50/42; A23K 20/163; A23K 40/25
See application file for complete search history.

(56) References Cited

U.S. PATENT DOCUMENTS

| | | |
|---|---|---|
| 4,162,336 A | 7/1979 | Brown, Jr. et al. |
| 6,506,401 B1 | 1/2003 | Rothamel et al. |
| 6,929,793 B2 | 8/2005 | Spivey-Krobath et al. |
| 7,189,390 B2 | 3/2007 | Zink et al. |
| 2006/0105025 A1* | 5/2006 | Hill ........................ A61K 36/00 424/766 |

FOREIGN PATENT DOCUMENTS

| | | |
|---|---|---|
| CA | 1202516 A | 4/1986 |
| CA | 2950350 | 12/2015 |
| EP | 1143806 | 4/2006 |
| EP | 1296565 | 8/2006 |
| EP | 1482811 | 8/2006 |
| EP | 1213970 | 6/2008 |
| WO | WO-2012080494 A1 * | 6/2012 ........... A23K 20/163 |

OTHER PUBLICATIONS

Edney et al. Malt | Malt Types and Products, Editor(s): Benjamin Caballero, Encyclopedia of Food Sciences and Nutrition (Second Edition), Academic Press, 2003, pp. 3671-3677 (Year: 2003).*
Gupta et al. Barley for Brewing: Characteristic Changes during Malting, Brewing and Applications of its By-Products. Compr Rev Food Sci Food Saf. May 2010; 9(3):318-328) (Year: 2010).*
He et al., Evaluation of selected categories of pet treats using in vitro assay and texture analysis, Translational Animal Science, vol. 4, Issue 2, Apr. 2020, pp. 1023-1030 (Year: 2020).*
Infinita Biotech (Enzymes Used in the Brewing Process, 2019, https://web.archive.org/web/20200818113643/https://infinitabiotech.com/blog/enzymes-used-in-the-brewing-process/). (Year: 2019).*
Mintel "Dry Cat Food Repackaging", www.gnpd.com Record Id 955010, Aug. 29, 2008, pp. 1-3, XP055881699.
Mintel "Farm Raised Chicken, Peas & Carrots Premium Food for Dogs", www.gnpd.com Record Id 5441861, Feb. 12, 2018, pp. 1-4, XP055879151.
International Search Report and Written Opinion to PCT/IB2021/060571 dated Jan. 31, 2022.

* cited by examiner

*Primary Examiner* — Michele L Jacobson
*Assistant Examiner* — Carrie Glimm

(57) ABSTRACT

The present invention is directed to compositions and methods relating to kibble for a companion animal, the kibble comprising protein, carbohydrate, fat, and a plasticizer, wherein the plasticizer comprises hydrolyzed malted barley.

20 Claims, No Drawings

COMPOSITIONS AND METHODS FOR PET FOOD

CROSS REFERENCE TO RELATED APPLICATION

This application claims priority to U.S. Provisional Application Ser. No. 63/124,224 filed Dec. 11, 2020, the disclosure of which is incorporated in its entirety herein by this reference.

BACKGROUND

Processed foods, including pet foods, may be presented in a dry form to extend shelf-life. For example, food products having a moisture level of less than about 20% by weight of the composition may deter microbial growth that could spoil the food product. Dry foods may also be less sensitive, in some regards, to oxidation or other chemical processes that can change the taste, texture, or appearance of the food over periods of months or years prior to use.

Unfortunately, dry foods may look coarse, powdery, or dry, and therefore may be unappetizing. Dry foods can be perceived to be harder, crunchier, or denser than less dried foods. Additionally, the lack of moisture may negatively impact mouth feel when the product is eaten, compared to semi-moist or wet food.

As such, soft-dry types of foods can be desired as they may be perceived as a more chewy and palatable food product. Such soft-dry pet food often contains propylene glycol and glycerol. Propylene glycol is used for preservation purposes and glycerol is used as a plasticizer in order to create an extruder product of desirably chewy and meat-like texture. However, such additives may be considered undesirable by consumers.

There remains a need for a soft-dry food, particularly a pet food, which meets competing demands for taste, texture, appearance, convenience, and nutritional content.

SUMMARY

The present disclosure relates generally to methods and compositions for providing soft dry pet foods.

In one embodiment, a kibble for a companion animal can comprise protein, carbohydrate, fat, and a plasticizer, where the plasticizer comprises hydrolyzed malted barley.

In another embodiment, a method of manufacturing a soft, dry kibble can comprise admixing protein, carbohydrate, fat, and a plasticizer to form an admixture, and processing the admixture to form the soft, dry, kibble; where the plasticizer comprises hydrolyzed malted barley.

Additional features and advantages are described herein and will be apparent from the following Detailed Description.

DETAILED DESCRIPTION

Definitions

As used in this disclosure and the appended claims, the singular forms "a," "an" and "the" include plural referents unless the context clearly dictates otherwise. Thus, for example, reference to "a plasticizer" or "the plasticizer" includes two or more plasticizers. The term "and/or" used in the context of "X and/or Y" should be interpreted as "X," or "Y," or "X and Y." Where used herein, the terms "example" and "such as," particularly when followed by a listing of terms, are merely exemplary and illustrative, and are not exclusive or comprehensive.

The term "companion animal" means domesticated animals such as cats, dogs, rabbits, guinea pigs, ferrets, hamsters, mice, gerbils, horses, cows, goats, sheep, donkeys, pigs, and the like. In one aspect, the companion animal can be a canine. In another aspect, the companion animal can be a feline.

As used herein, "about" is understood to refer to numbers in a range of numerals, for example the range of −10% to +10% of the referenced number, within −5% to +5% of the referenced number, or in one aspect, within −1% to +1% of the referenced number, and in a specific aspect, within −0.1% to +0.1% of the referenced number. Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

All percentages expressed herein are by weight of the total weight of the food composition unless expressed otherwise. When reference is made to the pH, values correspond to pH measured at 25° C. with standard equipment. An "amount" can be the total amount of the referenced component per serving of the composition or per distinct unit of the composition and/or can be the weight percentage of the referenced component by dry weight. Moreover, an "amount" includes zero; for example, the recitation of an amount of a compound does not necessarily mean that the compound is present, unless followed by a range that excludes zero.

The terms "pet food," "pet food product" and "pet food composition" mean a product or composition that is intended for ingestion by a canine or feline that provides at least one nutrient to the animal. Further in this regard, these terms mean that the product or composition is in a form ready for consumption and is not merely an intermediate from which a consumable product or composition is made, although other food compositions can be added in some embodiments, such as a dietary supplement. The term "pet food" means any food composition intended to be consumed by a canine or feline.

The term "soft" refers to a quantifiable parameter and is defined as specific force measurements required to compress a pet food product or kibble 50% with a return height of the pet food after compression using an Instron Universal Tester, 5965B model using the following procedures: pet food product is centered below a 1" diameter round metal disc probe; the probe travels at 120 mm/min until 50% of the original height of the product is compressed; during this compression, the peak (maximum) force and slope between 0.25-1 mm of compression is recorded; the product is held at 50% compression of original height for five seconds; the probe then releases the product (travels at 300 mm/min to starting position), holds for an additional 5 seconds, and then returns to measure the return height of the product (travels at 120 mm/min for return). Primary parameters include: Test type: Compression; Preload/Test Start: 10 gf; Compression Speed: 120 mm/min; Compression Distance: 50% of specimen height; Compression Hold Time: 5 sec; Compression Release Speed: 300 mm/min; Release Hold Time After Compression: 5 sec; Post Compression Speed for Height Measurement: 120 mm/min; Results: Maximum Force, Specimen Height, Slope (segment 0.25-1 mm compression), Return Height, % of Original Height.

The relative terms "improve," "increase," "enhance," "decrease" and the like refer to the effects of the composition disclosed herein (a composition comprising hydrolyzed barley) relative to a composition having a lower amount or lacking such compositional elements, but otherwise identical.

A "blended" composition merely has at least two components having at least one different characteristic relative to each other. In one aspect, moisture content and water activity can be different in the context of the present disclosure. In this regard, description of a composition as "blended" does not imply that the blended composition has been subjected to processing sometimes referenced as "blending," namely mixing components so that they are indistinguishable from each other, and, in one aspect, such processing is avoided when mixing one component with the other components to form a blended composition (e.g., mixing a dry component with a wet or semi-moist component). Further in this regard, in a blended composition each of the at least two components having at least one different characteristic relative to each other can retain their distinct identity and appearance.

"Wet food" means a pet food having a moisture content from about 50% to about 90%, and in one aspect, from about 70% to about 90%. "Dry food" means a pet food having a moisture content less than about 20%, and in one aspect, less than about 15%, and in a specific aspect, less than about 10%. "Semi-moist food" means a pet food having a moisture content from about 20% to about 50%, and in one aspect, from about 25% to about 35%.

"Kibbles" is used synonymously with "chunks" herein and both terms mean pieces of dry or semi-moist pet food which can have a pellet shape or any other shape and can be made by slicing a food composition into separate pieces. Non-limiting examples of kibbles include particulates; pellets; pieces of pet food, dehydrated meat, meat analog, vegetables, and combinations thereof; and pet snacks, such as meat or vegetable jerky, rawhide, and biscuits. A "meat analog" is a meat emulsion product that resembles pieces of natural meat in appearance, texture, and physical structure.

The term "complete and balanced" when referring to a food composition means a food composition that contains all known required nutrients in appropriate amounts and proportions based on recommendations of recognized authorities in the field of animal nutrition, and are therefore capable of serving as a sole source of dietary intake to maintain life or promote production, without the addition of supplemental nutritional sources. Nutritionally balanced pet food and animal food compositions are widely known and widely used in the art, e.g., complete and balanced food compositions formulated according to standards established by the Association of American Feed Control Officials (AAFCO) as of Jan. 1, 2020.

The compositions disclosed herein may lack any element that is not specifically disclosed herein. Thus, a disclosure of an embodiment using the term "comprising" includes a disclosure of embodiments "consisting essentially of" and "consisting of" the components identified. Similarly, the methods disclosed herein may lack any step that is not specifically disclosed herein. Thus, a disclosure of an embodiment using the term "comprising" includes a disclosure of embodiments "consisting essentially of" and "consisting of" the steps identified. Any embodiment disclosed herein can be combined with any other embodiment disclosed herein unless explicitly and directly stated otherwise.

The present discussion of embodiments, aspects, examples, etc. are independent in that they can apply to all methods and compositions. For example, colostrum used in a food composition can also be used in the method of preventing or treating an allergy of an animal, and vice versa.

EMBODIMENTS

The present inventors have discovered that a soft, dry kibble can be made using hydrolyzed malted barley. The present compositions and methods include hydrolyzing malted barley and forming an extruded kibble using the hydrolyzed malted barley including manufacturing pet foods with said kibble.

In one embodiment, a kibble for a companion animal can comprise protein, carbohydrate, fat, and a plasticizer, where the plasticizer comprises hydrolyzed malted barley.

In another embodiment, a method of manufacturing a soft, dry kibble can comprise admixing protein, carbohydrate, fat, and a plasticizer to form an admixture, and processing the admixture to form the soft, dry, kibble; where the plasticizer comprises hydrolyzed malted barley.

Generally, the hydrolyzed malted barley can be present such that the resulting extruded kibble is soft. In one embodiment, the hydrolyzed malted barley is present in the composition in an amount of from about 14 weight % to about 21 weight %. In other embodiments, the hydrolyzed malted barley can be present in amounts from 14 weight %, 15 weight %, 16 weight %, 17 weight %, 18 weight %, 19 weight %, or even 20 weight %, to 15 weight %, 16 weight %, 17 weight %, 18 weight %, 19 weight %, 20 weight %, or even 21 weight %.

In one embodiment, the hydrolyzed malted barley can have a glucose content in an amount of at least 20 weight %. In other aspects, the glucose content can be from about 5 weight % to about 50 weight %, about 10 weight % to about 50 weight %, about 20 weight % to about 50 weight %, about 20 weight % to about 45 weight %, or even from about 20 weight %, 25 weight %, 30 weight %, 35 weight %, or 40 weight % to about 30 weight %, 35 weight %, 40 weight %, 45 weight %, or 50 weight %.

In one embodiment, the hydrolyzed malted barley can have a maltose content in an amount of less than 10 weight %. In other aspects, the maltose content can be from about 0.01 weight % to 30 weight %, 0.01 weight % to 20 weight %, 0.01 weight % to 10 weight %, 0.01 weight % to 5 weight %, 1 weight % to 5 weight %, or even from about 0.01 weight %, 0.1 weight %, or 1 weight % to about 1 weight %, 2 weight %, 3 weight %, 4 weight %, 5 weight %, 10 weight %, 15 weight %, or 20 weight %.

Generally, the moisture content of the hydrolyzed malted barley can be at least 20 weight %. In one embodiment, the moisture content can be from about 25 weight % to about 45 weight %, about 25 weight % to about 40 weight %, about 30 weight % to about 40 weight %, or even about 20 weight % to about 50 weight %.

Generally, the kibble can have a moisture content commensurate with product form and desired texture, firmness. In one embodiment, the kibble can have a moisture content of about 5 weight % to about 15 weight %. In other embodiments, the moisture content can be from about 2 weight % to about 10 weight %, about 5 weight % to about 15 weight %, or even about 5 weight % to about 20 weight %. In one embodiment, the total moisture content can be less than 5% by weight of the supplement. Similarly, the dietary supplement can have a water activity in the range of 0.20 to 0.75. In one aspect, the water activity can be less than 0.60.

Generally, the present hydrolyzed malted barley can be added to the kibble such that the desired softness is obtained as discussed herein. Such softness can be quantitatively measured as discussed herein. In one embodiment, the kibble can have a softness of about 10,000 gram-force (gf) to about 15,000 gf. In other embodiments, the softness can be from about 11,000 gf to about 14,000 gf, about 12,000 gf to about 14,000 gf, about 12,500 gf to about 13,500 gf, or even subranges contained therein. In another embodiment, the softness can be measured as about 1 to about 2 slope (segment 0.25 mm-1 mm).

As discussed herein, the kibble can be part of a pet food composition. Such compositions can be main meal pet foods, complete and balanced pet foods, or even treats. In some aspects, such compositions can be blended composition.

As discussed herein, the processing steps of making the kibble generally include admixing protein, carbohydrate, fat, and a plasticizer to form an admixture, and processing the admixture to form the soft, dry, kibble. In one aspect, the processing includes extruding the admixture to form the kibble and further drying the kibble. Such processing can include using a preconditioner and/or using a coating step after the kibble is formed and/or dried. In one example, the ingredients except for animal digest flavor and tallow edible w/vitamin E (these two are ingredients for the coating step) can be added into the preconditioner of a single extruder. Hydrolyzed malted barley liquid and processing water/steam can be added into the preconditioner as well. After extrusion cooking, the kibble is formed and cut at the end of the extruder. Then, the kibble is sent to a dryer to lose moisture down to 5-15%. After the drying step, a coating step can add animal digest flavor and tallow edible w/vitamin E onto the kibble surface.

Additionally, the compositions disclosed herein can contain other ingredients. In one embodiment, the compositions can contain probiotics and/or prebiotics. Typical probiotics include, but are not limited to, probiotic strains selected from Lactobacilli, Bifidobacteria, or Enterococci, e.g., *Lactobacillus reuteii, Lactobacillus acidophilus, Lactobacillus animalis, Lactobacillus ruminis, Lactobacillus johnsonii, Lactobacillus casei, Lactobacillus paracasei, Lactobacillus rhamnosus, Lactobacillus fermentum,* and *Bifidobacterium* sp., *Enterococcus faecium* and *Enterococcus* sp. In some embodiments, the probiotic strain can be selected from the group consisting of *Lactobacillus reuteri* (NCC2581; CNCM I-2448), *Lactobacillus reuteri* (NCC2592; CNCM I-2450), *Lactobacillus rhamnosus* (NCC2583; CNCM I-2449), *Lactobacillus reuteri* (NCC2603; CNCM I-2451), *Lactobacillus reuteri* (NCC2613; CNCM I-2452), *Lactobacillus acidophilus* (NCC2628; CNCM I-2453), *Bifidobacterium adolescentis* (e.g., NCC2627), *Bifidobacterium* sp. NCC2657 or *Enterococcus faecium* SF68 (NCIMB 10415). Generally, the food compositions can contain probiotics in amounts sufficient to supply from about $10^4$ to about $10^{12}$ cfu/animal/day, in one aspect, from $10^5$ to about $10^{11}$ cfu/animal/day, and in one specific aspect, from $10^7$ to $10^{10}$ cfu/animal/day. When the probiotics are killed or inactivated, the amount of killed or inactivated probiotics or their components should produce a similar beneficial effect as the live microorganisms. Many such probiotics and their benefits are known to skilled artisans, e.g., EP1213970B1, EP1143806B1, U.S. Pat. No. 7,189,390, EP1482811B1, EP1296565B1, and U.S. Pat. No. 6,929,793. In one embodiment, the probiotic can be *Enterococcus faecium* SF68

(NCIMB 10415). In another embodiment, the probiotics can be encapsulated in a carrier using methods and materials known to skilled artisans.

Prebiotics include any substance that alters microflora composition of the gastrointestinal tract by providing a substrate for growth of microorganisms. Prebiotics include, without limitation, natural and synthesized oligosaccharides, soluble fibers, resistant starch, and gums. The oligosaccharides can be linear or branched. The prebiotic can be specifically chosen for its ability to enhance the survival of the probiotic in the storage container, or in the gastrointestinal tract of an animal. The prebiotic can also be specifically chosen for its ability to enhance the functionality of the probiotic in the animal or to complement the benefits of the probiotic. Generally, prebiotics are administered in amounts sufficient to positively stimulate the healthy microflora in the gut and cause these "good" bacteria to reproduce. Typical amounts are from about one to about 10 grams per serving or from about 5 percent to about 40 percent of the recommended daily dietary fiber for an animal.

As discussed herein, the present composition can include animal digest. Useful animal digests in the present invention can be any animal digest known to skilled artisans included liquid animal digests and dried animal digests. Such digests include any material that results from chemical and/or enzymatic hydrolysis of clean and undecomposed animal tissue. Additionally, dried brewers yeast can be useful in the present invention, which is any dried brewers yeast known to skilled artisans, e.g., the dried, inactive agent that is a byproduct of the brewing industry. Animal digest and dried brewers yeast have been found to enhance the palatability of the compositions, including dietary supplements and food compositions. When present in such compositions, the animal digest comprises from about 1 weight % to about 90 weight % of the composition and the dried brewers yeast comprises from about 1 weight % to about 30 weight % of the composition.

The compositions of the invention can comprise additional substances such as minerals, vitamins, salts, proteins, amino acids, fibers, condiments, colorants, and preservatives. Non-limiting examples of minerals include calcium, phosphorous, potassium, sodium, iron, chloride, boron, copper, zinc, magnesium, manganese, iodine, selenium and the like, and various salts thereof. Non-limiting examples of vitamins include vitamin A, various B vitamins, e.g., niacin, pantothenic acid, folic acid, biotin, vitamin C, vitamin D, and vitamin K. The compositions may also comprise carotenoids such as alpha-carotene, lycopene, lutein, zeaxanthin and beta-cryptoxanthin. Additional ingredients may also be included, for example, inulin, amino acids, and the like.

In various embodiments, the compositions of the invention may further comprise from about 5% to about 60% crude protein. In one embodiment, the compositions comprise about 40% to about 55% crude protein. The crude protein material may comprise vegetable proteins such as soybean, corn, rice, cottonseed, and peanut, or animal proteins such as casein, albumin, and meat protein. Non-limiting examples of meat protein useful herein include pork, lamb, equine, poultry, fish, and mixtures thereof.

The compositions may further comprise from about 5% to about 40% fat. In one embodiment, the compositions can comprise about 15% to about 30% fat. The compositions may further comprise a source of carbohydrate. The compositions may comprise from about 10% to about 60% carbohydrate. Non-limiting examples of such carbohydrates include grains or cereals such as rice, corn, sorghum, alfalfa, barley, soybeans, canola, oats, wheat, and mixtures thereof.

The compositions may also optionally comprise other materials such as dried whey and other dairy by-products.

The compositions may also further comprise at least one fiber source. The compositions may comprise from about 0.5% to about 5% fiber. A variety of soluble or insoluble fibers may be utilized, as will be known to those of ordinary skill in the art. The fiber source can be beet pulp (from sugar beet), gum arabic, gum talha, *psyllium*, rice bran, carob bean gum, citrus pulp, pectin, fructooligosaccharide, mannanoligofructose, soy fiber, fiber from lupins, arabinogalactan, galactooligosaccharide, arabinoxylan, or mixtures thereof. The fiber source can be a fermentable fiber, as are many of those listed above. Fermentable fiber has previously been described to provide a benefit to the immune system of companion animals. Fermentable fiber or other compositions known to those of skill in the art which provide a prebiotic composition that could enhance the growth of probiotics within the intestine may also be incorporated into the composition to aid in the enhancement of the benefits provided by the present invention to the immune system gastrointestinal system, and general health of an animal.

The compositions can be specially formulated for particular animals such as dogs or cats. Similarly, the compositions may be specially formulated for young, adult, or senior animals. In one aspect, the animal can be a senior animal. In another aspect, the animal can be an aging animal. In general, specialized formulations comprise ingredients that meet the energy and nutritional requirements appropriate for particular animals and for particular animals at different stages of development or age, or with specific nutrient requirements related to a disease state.

In one embodiment, the kibble and pet food compositions can be formulated for companion animals. In one aspect, compositions can be formulated for dogs. In another aspect, the compositions can be formulated for cats.

The skilled artisan can determine the appropriate amount of ingredients to be added to a given formulation. Such factors that may be taken into account include the average consumption of specific types of compositions by different animals, whether the animal that is intended to ingest the dietary supplements has any particular health, wellness, or nutritional requirements, or suffers from a particular disease or disorder, the age, sex, size, or breed of the animal, and the manufacturing conditions under which the composition is prepared. The concentrations of ingredients to be added to the composition can be calculated on the basis of the energy and nutrient requirements of the animal.

As discussed herein, in various embodiments, the present compositions can be pet food compositions. In various embodiments, the pet food composition can be a semi-moist food or a dry food. In an embodiment, the pet food composition or kibble is one or more components of a blended composition.

The pet food compositions disclosed herein can be any food formulated for consumption by a canine or feline. In an embodiment, the pet food composition can be a complete and balanced pet food; i.e., provides complete nutrition as defined by the Association of American Feed Control Officials (AAFCO) for a canine or feline as of Jan. 1, 2020.

The pet food compositions disclosed herein can comprise vegetable oil, a flavorant, a colorant and water. Suitable vegetable oils include soybean oil, corn oil, cottonseed oil, sunflower oil, canola oil, peanut oil, safflower oil, and the like. Examples of suitable flavorants include yeast, tallow, rendered animal meals (e.g., poultry, beef, lamb, pork), flavor extracts or blends (e.g., grilled beef), animal digests, and the like. Suitable colorants include FD&C colors, such as blue no. 1, blue no. 2, green no. 3, red no. 3, red no. 40, yellow no. 5, yellow no. 6, and the like; natural colors, such as caramel coloring, annatto, chlorophyllin, cochineal, betanin, turmeric, saffron, paprika, lycopene, elderberry juice, pandan, butterfly pea and the like; titanium dioxide; and any suitable food colorant known to the skilled artisan.

The pet food compositions disclosed herein can optionally include additional ingredients, such as humectants, preservatives, polyols, salts, or combinations thereof. Suitable humectants include salt, sugars, propylene glycol and polyhydric glycols such as glycerin and sorbitol, and the like. Non-limiting examples of suitable preservatives include potassium sorbate, sorbic acid, sodium methyl para-hydroxybenzoate, calcium propionate, propionic acid, and combinations thereof.

Specific amounts for each additional ingredient in the pet food compositions disclosed herein will depend on a variety of factors such as the ingredient included in the first edible material and any second edible material; the species of animal; the animal's age, body weight, general health, sex, and diet; the animal's consumption rate; the purpose for which the food product is administered to the animal; and the like.

EXAMPLES

The following non-limiting examples are illustrative of embodiments of the present disclosure.

Example 1—Hydrolyzed Malted Barley Study

The following process was used to hydrolyze malted barley liquid before adding it into the extruder to form a soft, dry kibble. Commercially available malted barley liquid from BRIESS Malt & Ingredients Co. was used as the starting material. A two-step enzyme hydrolysis process was used to hydrolyze the commercial malted barley liquid as described below. The major processing equipment used included the cooking kettle (batch size 800-1000 Lbs/batch) with constant agitation, jacket heating, and temperature control capability. Table 1 provides the formula used:

TABLE 1

| Ingredient Description | Formula weight % |
| --- | --- |
| Amylase (BAN ® 480L from Novozymes) | 0.75 |
| Glucoamylase (Amylase ™ AG 300 L from Novozymes) | 0.75 |
| Pullulanase (Promozyme ® D2 from Novozymes) | 0.75 |
| Broad spectrum carbohydrase (Viscozyme ® L from Novozymes) | 0.75 |
| Water Addition | 18.00 |
| Malted Barley Liquid | 79.00 |
| SUM | 100.00 |

The first four ingredients in Table 1 are enzymes, all of them commercially available. Stepwise process conditions are provided in Table 2:

TABLE 2

| Step | Procedure |
| --- | --- |
| 1 | Pre-heat malted barley mixed with water to 75-80° C./167-176° F. and hold for 20 min to gelatinize starch |
| 2 | Add amylase (BAN ® 480L) and continue holding at temperature (75-80° C./167-176° F.) for 2.0 hours |

TABLE 2-continued

| Step | Procedure |
| --- | --- |
| 3 | Cool the liquid down to 60° C./140° F. |
| 4 | Add Glucoamylase, Pullulanase, and Viscozyme ® L |
| 5 | Hold at temperature 55-60° C./131-140° F. for 2.5 hours |
| 6 | Heat the liquid to 95° C./203° F. and hold at the temperature for 15 min |

During the above hydrolysis treatment, enzymes gradually break down the larger molecular weight polysaccharides and oligosaccharides in malted barley releasing significant amounts of small molecules (monosaccharides). Table 3 below shows the sugar profile with the monosaccharides (mostly glucose) amount significantly increased by the hydrolysis process.

TABLE 3

| Description | Moisture weight % | Fructose weight % | Glucose weight % | Sucrose weight % | Maltose weight % | Lactose weight % |
| --- | --- | --- | --- | --- | --- | --- |
| Malted Barley Liquid | 21.9 | 0.58 | 3.56 | 0.72 | 35.3 | 0.53 |
| Hydrolyzed Malted Barley | 34.5 | 0.95 | 37.3 | 1.69 | 1.59 | <0.200 |

After the hydrolysis process, hydrolyzed malted barley was added into the extruder as a functional ingredient for soft, dry kibble production. 19% hydrolyzed malted barley that was hydrolyzed from 15% malted barley liquid was added into a standard dog food extrusion process. Except for hydrolyzed malted barley, all ingredients are standard dry pet food production ingredients. Table 4 provides the formula with ranges for the ingredients:

TABLE 4

| Ingredient | Weight % |
| --- | --- |
| Barley Lightly Pearled | 3-4.5 |
| Wheat Whole | 20-30 |
| Amino Acid L-Lysine | 0.01-0.05 |
| Potassium Chloride | 0.1-1 |
| Pea Green Dried Ground | 0.1-1 |
| Corn Gluten Meal 60% | 5-10 |
| OAT MEAL | 4-7 |
| Vitamin and Mineral Premix | 0.01-2.5 |
| Egg and Chicken Flavor | 1-5 |
| Soybean Meal Dehulled | 5-10 |
| Poultry By-Product Meal | 2-6 |
| Chicken By-Product Meal | 5-10 |
| Calcium Carbonate | 0.5-1 |
| Monocalcium - Dicalcium Phosphate | 0.1-0.5 |
| Salt | 1-5 |
| Choline Chloride 70% Liquid | 0.01-0.1 |
| Mono- and Diglycerides | 0.01-0.5 |
| Hydrolyzed Malted Barley Liquid | 19 |
| Animal Digest Flavor | 0.1-1 |
| Tallow Edible w/ Vitamin E | 1-10 |
| SUM | 100.000 |

The extruded kibble went through a slight drying process and obtained a finished product with 11.6% moisture after drum coating. For comparison purpose, another formula with 15% malted barley liquid (all other ingredients are the same) was run with the same extruder and processing conditions. Table 5 provides the comparison formula with ranges for the ingredients:

TABLE 5

| Ingredient | Weight % |
| --- | --- |
| Barley Lightly Pearled | 3-4.5 |
| Wheat Whole | 20-30 |
| Amino Acid L-Lysine | 0.01-0.05 |
| Potassium Chloride | 0.1-1 |
| Pea Green Dried Ground | 0.1-1 |
| Corn Gluten Meal 60% | 5-10 |
| OAT MEAL | 4-7 |
| Vitamin and Mineral Premix | 0.01-2.5 |
| Egg and Chicken Flavor | 1-5 |
| Soybean Meal Dehulled | 5-10 |
| Poultry By-Product Meal | 2-6 |
| Chicken By-Product Meal | 5-10 |
| Calcium Carbonate | 0.5-1 |
| Monocalcium - Dicalcium Phosphate | 0.1-0.5 |

TABLE 5-continued

| Ingredient | Weight % |
| --- | --- |
| Salt | 1-5 |
| Choline Chloride 70% Liquid | 0.01-0.1 |
| Mono- and Diglycerides | 0.01-0.5 |
| Malted Barley Liquid | 15 |
| Water Addition | 1-5 |
| Animal Digest Flavor | 0.1-1 |
| Tallow Edible w/ Vitamin E | 1-10 |
| SUM | 100.000 |

The extruded comparison kibble went through a similar drying process and obtained a comparable finished product with 11.3% moisture after drum coating.

A palatability 2-bowl comparison test was conducted on 20 dogs with the finished products from above two formulas. Table 6 provides the results of the palatability testing:

TABLE 6

| Product | Description | Average % Consumption |
| --- | --- | --- |
| A | kibble w/ 15% malted barley liquid | 35.9 |
| B | kibble w/ 19% hydrolyzed malted barley liquid | 64.1 |

As shown in Table 6, the test product using the present hydrolysis process improved the palatability of the kibble making it more palatable to dogs.

A texture profile analysis (TPA) was conducted to compare the softness of the finished products from the above two formulas as well as to a kibble containing a common plasticizer, glycerin. TPA was performed by an Instron 5965B Texture Analyzer. Testing methodology used involved kibble compression to a fixed % height. A 1" round disk shaped metal probe was selected to conduct the compression. A maximum load (same as peak force) was recorded for 50% compression. 30 pieces of kibbles were tested for each composition. Then individual piece data were averaged to determine the mean maximum load/peak force and the mean slope. Table 7 provides the TPA result:

TABLE 7

| Product | Description | Mean Instron Peak Force [gf] | Mean Slope (Segment 0.25 mm - 1 mm) |
|---------|-------------|------------------------------|-------------------------------------|
| A | kibble w/ 15% malted barley liquid | 19557.77 | 3.85 |
| B | kibble w/ 19% hydrolyzed malted barley liquid | 13037.99 | 1.70 |
| C | kibble w/ 9% glycerin | 13008.17 | 2.28 |

The hydrolysis process brought plasticizer function into malted barley liquid. Hydrolyzed malted barley liquid can be used as an effective plasticizer to increase the softness of extruded dry kibble. Notably, 19% hydrolyzed malted barley liquid achieved comparable plasticizer effect as 9% glycerin, which is a well-known good plasticizer for extruded pet food kibble. In fact, the hydrolyzed liquid barley had a better mean slope measurement than the glycerin kibble.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A kibble for a companion animal comprising protein, carbohydrate, fat, and a plasticizer,
wherein the plasticizer comprises hydrolyzed malted barley, wherein the hydrolyzed malted barley has glucose in an amount of at least 20 weight % and maltose in an amount of less than 10 weight %,
wherein the kibble has a moisture content of about 5 weight % to about 15 weight % and a softness of about 10,000 gram-force (gf) to about 15,000 gf and/or about 1-2 N/mm slope (segment 0.25 mm-1 mm).

2. The kibble of claim 1, wherein the hydrolyzed malted barley is present in the composition in an amount of from about 14 weight % to about 21 weight %.

3. The kibble of claim 1, wherein the hydrolyzed malted barley is present in the composition in an amount from 19 weight % to 21 weight %.

4. The kibble of claim 1, wherein the softness of the kibble is about 10,000 gram-force (gf) to about 15,000 gf.

5. The kibble of claim 1, wherein the softness of the kibble is about 1-2 N/mm slope (segment 0.25 mm-1 mm).

6. The kibble of claim 1, wherein the protein is present in the kibble in an amount from about 5% to about 60%, and the carbohydrate is present in the kibble in an amount from about 10% to about 60%.

7. The kibble of claim 1, wherein the kibble is formulated for a canine or a feline.

8. The kibble of claim 1, wherein the companion animal is a canine.

9. The kibble of claim 1, wherein the glucose is 35 weight % to 50 weight % of the hydrolyzed malted barley, and the maltose is 0.01 weight % to 5 weight % of the hydrolyzed malted barley.

10. The kibble of claim 1, wherein the fat is about 15 weight % to about 30 weight % of the kibble.

11. The kibble of claim 1, wherein the moisture content of the kibble is about 11 weight % to about 15 weight %.

12. The kibble of claim 1, wherein the hydrolyzed malted barley was formed by hydrolyzing malted barley with at least one exogenous enzyme, and the hydrolyzed malted barley comprises the at least one exogenous enzyme.

13. A pet food composition comprising the kibble of claim 1.

14. A method of manufacturing a kibble, the method comprising:
admixing protein, carbohydrate, fat, and a plasticizer to form an admixture; and
processing the admixture to form the kibble,
wherein the plasticizer comprises hydrolyzed malted barley, wherein the hydrolyzed malted barley has glucose in an amount of at least 20 weight % and maltose in an amount of less than 10 weight %,
wherein the kibble has a moisture content of about 5 weight % to about 15 weight % and a softness of about 10,000 gram-force (gf) to about 15,000 gf and/or about 1-2 N/mm slope (segment 0.25 mm-1 mm).

15. The method of claim 14, wherein the processing includes extruding the admixture to form the kibble and further drying the kibble.

16. The method of claim 14, wherein the softness of the kibble is about 10,000 gf to 15,000 gf.

17. The method of claim 14, wherein the softness of the kibble is about 1-2 N/mm slope (segment 0.25 mm-1 mm).

18. The method of claim 14, wherein the glucose is 35 weight % to 50 weight % of the hydrolyzed malted barley, and the maltose is 0.01 weight % to 5 weight % of the hydrolyzed malted barley.

19. The method of claim 14, wherein the fat is about 15 weight % to about 30 weight % of the kibble.

20. The method of claim 14, comprising forming the hydrolyzed malted barley by hydrolyzing malted barley with at least one exogenous enzyme.

* * * * *